June 16, 1964
S. J. SALERNO
3,137,092
MECHANISM FOR SIMULATING SOUNDS AND
VIBRATIONS OF A HEART BEAT
Filed May 15, 1961
2 Sheets-Sheet 1
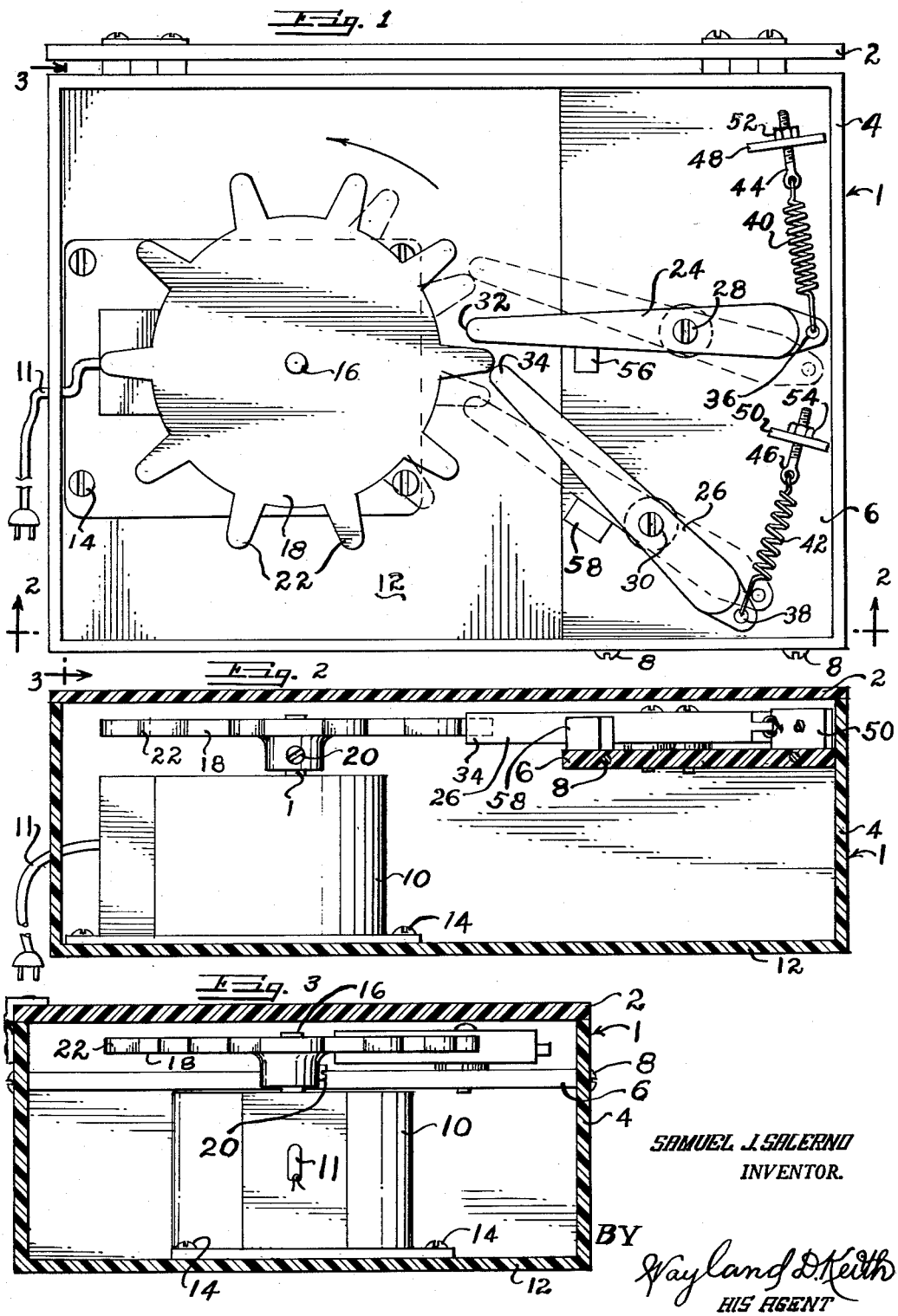
SAMUEL J. SALERNO
INVENTOR.
BY Wayland D. Keith
HIS AGENT

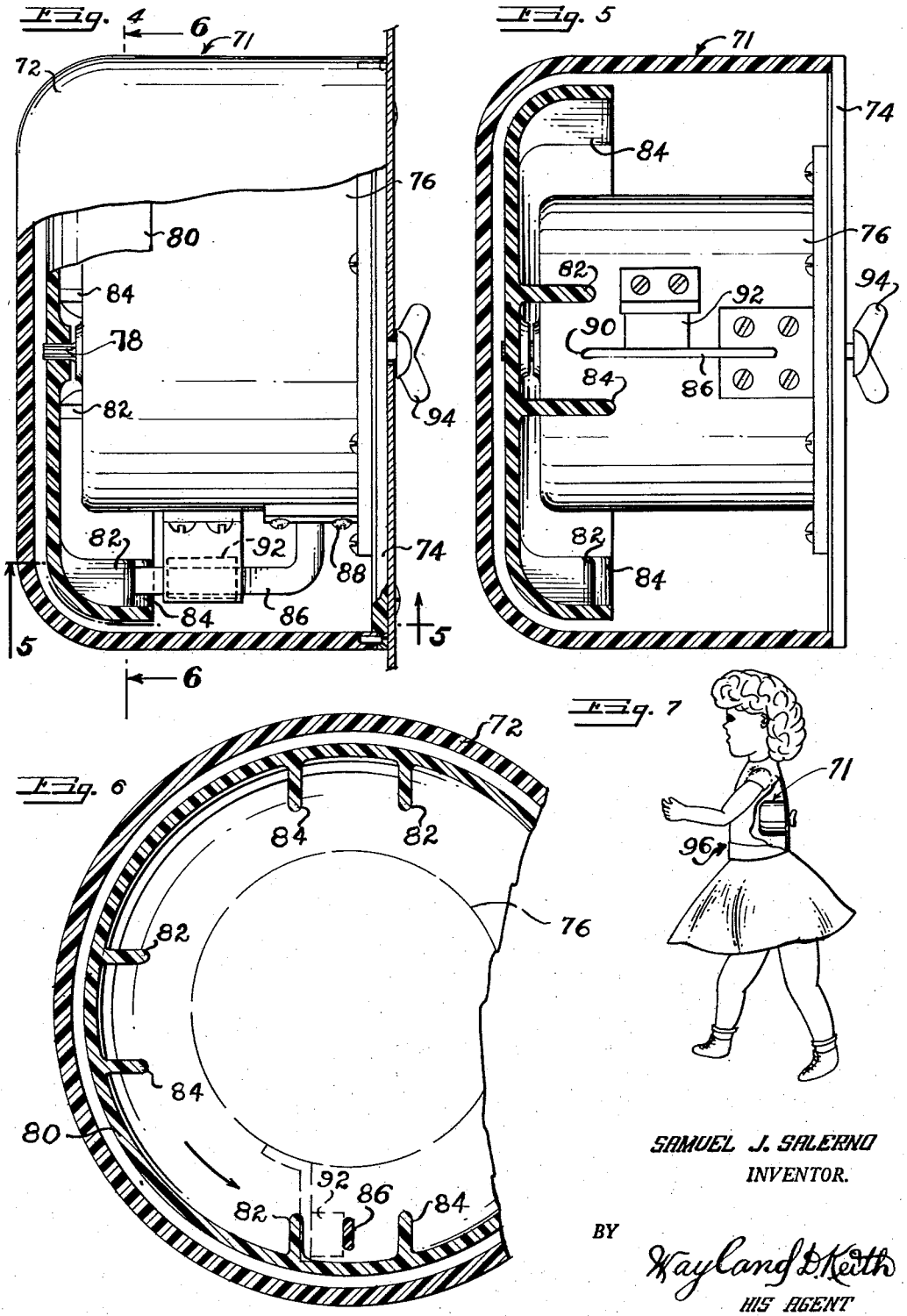

United States Patent Office 3,137,092
Patented June 16, 1964

3,137,092
MECHANISM FOR SIMULATING SOUNDS AND VIBRATIONS OF A HEART BEAT
Samuel J. Salerno, Wichita Falls, Tex., assignor to J. L. Ross, Wichita Falls, Tex.
Filed May 15, 1961, Ser. No. 110,110
2 Claims. (Cl. 46—232)

This invention relates to a mechanism to simulate a heart beat, and more particularly to a heart beat mechanism which will reproduce simulated sounds of a live beating heart.

It has been found that sounds with vibrations, simulating the heat beat to which an infant has become accustomed in the prenatal state, is quite soothing to ill or restless infants, but it is not always possible or expedient for the mother to sooth the infant by holding the infant against her body so it can feel her heart beat.

The present invention relates to a mechanism which will simulate the human heart beat by reproducing the systolic and diastolic rhythmic sounds and vibrations in their exact co-ordinated relation, and which mechanism may be encased within a suitable housing so as to be placed with an infant in its crib, in order to give the soothing effect to the infant, if the mother cannot be on hand to sooth the infant.

The present mechanism is particularly helpful for use with infants who are ill and require more attention than it is usually possible for the mother to give them.

Various sound mechanisms have been proposed heretofore for making consecutive sounds; however these mechanisms have lacked the co-ordinated ratio of sounds produced and also the intensity or heavy thump and the light thump to bring out a sound and vibration that will closely approch the sound of a beating heart, both for co-ordinated time element as well as the particular muffled sound as produced on the systolic and diastolic beats of the human heart.

In the absence of the mother, so the infant can be near her and can feel and hear the sound and vibration of her heart, an infant is often restless. In the present instance the device can be placed in a sound cabinet in close proximity to an infant so that the sound and vibration from the sound cabinet, or from a simulated heart mechanism encased within a toy animal, such as a doll, cat, dog, teddy bear or the like so when the child caresses the toy, or is in contact relation therewith, both the sound and the rhythmic vibration of the heart is transmitted directly to the infant, thereby it is soothed and pacified to such an extent that the nerves of the infant will be relaxed and normal sleep will be the usual result.

Two embodiments of the invention are disclosed herein as representative of the manner in which the invention may be produced; however it is to be understood that variations may be made in the mechanism and in the installation of the mechanism within various elements, whether in a sound cabinet, or within a simulated animal or within a pillow or mattress, within the scope and intent of the invention, and as set out in the appended claims.

An object of the invention is to provide a sound and vibration producing mechanism to closely simulate the sound and rhythmic movement of the human heart, wherein both the systolic and diastolic movements of the heart are reproduced in coordinated relation to give both the sound and the vibratory movement in the correct time relation and beat per minute of the heart of a living person.

Another object of the invention is to provide a heart beat mechanism which will produce a sound and vibration simulating the heart beat of a person, so as to produce a soothing effect on an infant or the like.

Still another object of the invention is to provide a simulated heart beat mechanism which will produce the simulated sound and vibration of the systolic and diastolic movements of the heart within a sound cabinet which may be placed in close proximity to an infant.

With these objects in mind and others which will become manifest as the description proceeds, reference is to be had to the accompanying drawing in which like reference characters designate like parts in the several views thereof.

In the drawing:

FIG. 1 is a top plan view of a mechanism to simulate a heart beat which is shown installed within a sound cabinet, showing the lid thereof in open position, and showing the mechanism in full outline wherein one of the simulated heart beats has been completed, the mechanism being shown in dashed outline wherein the other of the heart beat mechanisms has been completed;

FIG. 2 is a sectional view taken on line 2—2 of FIG. 1 and looking in the direction indicated by the arrows, and showing the heart beat mechanism installed on an electric gear motor so as to drive the mechanism to simulate heart beat which mechanism is in a timed co-ordinated relation;

FIG. 3 is a sectional view taken on line 3—3 of FIG. 1, looking in the direction indicated by the arrows, but showing the lid of the sound cabinet in closed position;

FIG. 4 is an elevational view of a modified form of the mechanism, with parts being broken away and parts being shown in section to bring out the details of construction, and showing a spring actuated winding motor therein;

FIG. 5 is a sectional view taken on line 5—5 of FIG. 4, looking in the direction indicated by the arrows, showing the relative spacing of the cam mechanism for actuating the sound and vibration reed in a co-ordinated timed relation with respect to the timing of the systolic and diastolic beats of the heart, as well as the correct beats per minute;

FIG. 6 is a section taken on the line 6—6 of FIG. 4, looking in the direction indicated by the arrows; and FIG. 7 is a diagrammatic view of a toy such as a doll, showing the mechanism installed therein for imparting sounds and vibrations therefrom, whether as a pacifier or as a toy.

With more specific reference to the invention the numeral 1 designates generally a housing which is constructed of plastic, wood or the like in the form of a box and having a lid 2 hinged to the box-like portion 4. A lateral support member 6 is secured in one end of the box-like member 4 by screws 8. A motor 10 is secured to the bottom portion 12 of the housing by screws 14, to hold the motor 10 in fixed relation thereto.

The motor is preferably of the electric type and has internal reduction gearing therein so as to reduce the speed of the power output shaft 16 to the desired number revolutions per minute. In the present instance it is preferable to have the shaft 16 run at a speed of approximately ten r.p.m., the purpose of which will be brought out more fully hereinafter.

A toothed cam wheel 18 is mounted on and fixedly secured to shaft 16 by a set screw 20. The toothed cam wheel has equally spaced teeth or cam lobes 22 thereon, in the present instance ten are shown. Arms 24 and 26 are pivotally mounted on the upper face of lateral support member 6 by means of screw threaded members 28 and 30, respectively. The arms 24 and 26 are rounded at one end, which rounded end lies in a plane traversed by teeth or cam lobes 22, so when the toothed cam wheel 18 is rotated in the direction indicated by the arrow, in FIG. 1, the ends of the respective arms 24 and 26 will engage lobes 22 to cause the arm 24 to be moved from the position shown in full outline to that shown in dashed outline, FIG. 1, and will cause arm 26 to be moved from the position shown in dashed outline to that shown in full outline in FIG. 1. The ends of the arms 24 and 26, opposite the rounded ends 32 and 34, are apertured as indicated at 36 and 38, respectively. The respective springs 40 and 42, have respective ends thereof attached in the respective apertures 36 and 38. The other end of each spring 40 and 42 is attached to the respective screw threaded eyes 44 and 46, which screw threaded eyes pass through apertured upstanding lugs 48 and 50, respectively, which lugs are secured interiorly of housing 1, in the proper position to receive the respective screw threaded eyes. The tension on the respective springs 40 and 42 is adjusted by the respective nuts 52 and 54 which are screw threaded onto the respective bolts of screw threaded eyes 44 and 46.

Abutments 56 and 58 are secured to the upper face of support member 6 and lie in a plane so, when the arms 24 and 26 are released from the respective cam lobes 22 on toothed cam wheel 18, the abutments 56 and 58 will stop the respective arms 24 and 26 in such manner as to give a sound that will simulate the beating of a heart, such as the human heart. The arms are so spaced that the lobes of the toothed cam wheel 18 will engage and release the arms 24 and 26 at such sequential timed intervals as to give the systolic and diastolic rhythm of the heart beat, with the arm 24 simulating the systolic sound of the heart by giving a heavier thump than the arm 26 which makes the sound and vibration that simulates the diastolic sound of the heart. Therefore, with the toothed cam wheel 18 rotating approximately ten r.p.m., and with ten teeth or lobes on the wheel, approximately eighty beats per minute will be had. The arms may be made of wood, plastic or the like and beat against the abutments or stops 56 and 58, which stops can be made of rubber, sponge rubber, plastic or wood or other suitable material, which will give a sound and vibration most nearly approaching the sound and vibration of a heart beat. A device producing sounds of this character can be placed in close proximity to an infant within a crib or the like, and the vibration which is transmitted through the mattress of the crib or through a pillow together with the sound produced thereby, will usually lull the baby to sleep without having to resort to artificial sleep producing techniques.

In the form of the invention, as shown in FIGS. 1 through 3, an electric motor 10 is used which has a cord 11 extending therefrom to a suitable source of electric power.

The sounds of the arms 24 and 26 thumping against the respective stops 56 and 58 may be varied by increasing or decreasing the tension on the respective springs 40 or 42 by the turning of nuts 52 and 54, to achieve the desired adjustment of the respective springs.

While an electric motor 10 has been shown, it is to be understood that this is representative of a power unit, and that a spring motor or the like, as shown in FIGS. 4 and 5, may be used as the source of power if electrical power is not available.

Modified Form of the Invention

A modified form of the invention is shown in FIGS. 4 through 7, wherein a housing, designated generally by the numeral 71, comprises a cover portion 72 and a bottom portion 74. A motor 76 is shown attached to the bottom portion 74, which motor is of the spring wound type and is geared so that the output shaft 78 operates at a relatively slow speed. In the present instance, the shaft operates at about twenty r.p.m. and has the outer end thereof splined to receive a cupped cam member 80, which is preferably made of plastic. The present device is shown to have four sets of cams therein which are arranged in spaced apart relation, as will best be seen in FIG. 6. The cams are designated at 75 82 and 84 and extend parallel with the axis of shaft 78 on motor 10, with the cam 82 being shorter than cam 84. The cupped cam member 80 rotates in the direction indicated by the arrow to give approximately eighty beats per minute.

A resilient arm 86 is mounted on the side of the motor 76 by screw threaded elements 88, which arm element extends laterally and lies within a path defined by the cams 82 and 84. The cam 82 is shown to be shorter than cam 84, which cam will move the arm outward until the end 90 of arm 86 thereof moves off of the cam, whereupon the arm 86 will move against an abutment 92, which abutment is made of rubber, wood, plastic or the like to produce the desired sound and vibration to simulate the systolic sound of a heart beat. With the cupped cam member 80 continuing to travel in the direction indicated by the arrow, cam 84 will engage the arm 86 and, when the arm 86 is moved a predetermined distance, the end 90 thereof will move off of the cam 84, and since the cam 84 extends laterally a greater distance than cam 82, the arm 86 will have traveled sufficient distance to cause a louder sound when the arm 86 strikes the abutment 92. With the cams 82 and 84 spaced apart the desired distances, the time beat of the device can be so regulated as to accurately simulate the systolic and diastolic sounds and vibrations produced by the heart beat.

The arm 86, as well as the stop or abutment 92, are shown to be mounted on the side of motor 76, which is shown to be a spring wound motor, therefore the device may be compactly made and yet produce a sound and vibration of the desired intensity. The device may be used separately and independently, as shown in FIGS. 4, 5, and 6, as a therapeutic device for the pacification of babies, which sounds and vibrations simulate the heart beat of a mother to such an extent that a baby will be sufficiently soothed to fall asleep when the device is placed within a crib, under the mattress or under a pillow.

While the arm 86 is shown to be made of plastic, it is to be understood, that it may be made of resilient metal, wood or other suitable material or combination of materials, so that the sounds and vibrations of the arm 86 engaging stop or abutment 92 will have the appropriate sound and rhythm of the heart.

A key 94 is provided for winding of the motor 76. The device may be made in varying sizes and be made sufficiently small to be installed within a doll, designated generally by the numeral 96, so when the doll is placed in contact relation with the infant, the vibrations and sounds will be transmitted from the doll to the infant to induce sleep, in the same manner as if a mother placed the infant to her breast, to provide the rhythmic sound of the heart beat.

Furthermore, it is within the scope and intent of this invention, to place the device within a doll to create interest in a "living doll" with a heart beat, for older children, who play with dolls, since the heart beat can be made to duplicate the exact timing of the heart beat of a human. Therefore, great interest can be created, which will give children hours of amusement.

Having thus clearly shown and described the invention what is claimed as new and desired to be secured by Letters Patent is:

1. A mechanism for simulating systolic and diastolic sounds and vibrations of a heart beat, comprising a housing, a motor mounted within said housing, a member connected to said motor and being rotatable thereby, said member having a plurality of uniformly spaced cam projections thereon, and a pair of yieldable means mounted in said housing and being peripherally spaced with respect to said rotatable member and engageable with each said cam projection on said rotatable member upon rotation of said rotatable member, abutments mounted on said housing, each said yieldable means being engageable with one of said abutments, said pair of yieldable means being so arranged peripherally with respect to said rotatable member that both of said yieldable means will be released from engagement with certain said cam projections to engage said respective abutments during the peripheral travel of the rotatable member of less than the peripheral spacing between the cam projections on said rotatable member to create sounds and vibrations in periodic sequence which will simulate a heart beat.

2. A mechanism for simulating systolic and diastolic sounds and vibrations of a heart beat comprising a housing, a motor mounted within said housing, a single member connected to said motor and being rotatable thereby, said rotatable member having evenly spaced cam projections on the periphery thereof, two members mounted on said housing for pivotal movement and each having an end thereof lying within the path traversed by said cam projections on said rotatable member, said pivoted members being spaced apart in circumferential relation with respect to each other around the periphery of said rotatable member so that said cam projections on said rotatable member will engage the respective ends of said pivoted members lying in said path, abutments mounted on said housing, each of which abutments is positioned to be in contact relation with the respective pivotally mounted members when said pivotally mounted members are in one position, a spring connected to said housing and to each of said pivoted members to urge said respective pivoted members toward the respective abutments at spaced apart time intervals of the travel of said rotatable member less than the circumferential spacing of the two cam projections to create the sounds and vibrations in periodic sequence which will simulate the heart beat when said pivoted members are engaged by said cam projections upon rotation of said rotatable member.

References Cited in the file of this patent
UNITED STATES PATENTS

| | | |
|---|---|---|
| 801,876 | Holmes | Oct. 17, 1905 |
| 1,601,721 | Colledanchise | Oct. 5, 1926 |
| 1,759,304 | Goodloe | May 20, 1930 |
| 2,757,480 | Uchill | Aug. 7, 1956 |
| 2,859,731 | Sutton | Nov. 11, 1958 |
| 2,940,755 | Pouder | June 14, 1960 |